United States Patent [19]

Nakashio et al.

[11] Patent Number: 5,236,029
[45] Date of Patent: Aug. 17, 1993

[54] HEAVY DUTY PNEUMATIC RADIAL TIRES WITH FATIGUE RESISTANT STEEL CARCASS CORDS

[75] Inventors: Satoshi Nakashio, Kodaira; Kiyohito Kawasaki, Akigawa, both of Japan

[73] Assignee: Bridgestone Corporation, Tokyo, Japan

[21] Appl. No.: 586,912

[22] Filed: Sep. 24, 1990

[30] Foreign Application Priority Data

Sep. 22, 1989 [JP] Japan .................. 1-245251

[51] Int. Cl.$^5$ .............. B60C 9/00; B60C 9/02; B60C 9/08
[52] U.S. Cl. ..................... 152/451; 152/556
[58] Field of Search .............. 152/451, 527, 556; 72/162

[56] References Cited

U.S. PATENT DOCUMENTS

| | | | |
|---|---|---|---|
| 4,481,996 | 11/1984 | De Bondt et al. | 152/451 |
| 4,628,977 | 12/1986 | Ogino et al. | 152/527 X |
| 4,737,392 | 4/1988 | Dambre | 152/451 X |
| 4,938,015 | 7/1990 | Kinoshita | 152/556 X |

FOREIGN PATENT DOCUMENTS

| | | | |
|---|---|---|---|
| 57-144105 | 9/1982 | Japan | 152/451 |
| 57-149578 | 9/1982 | Japan . | |
| 60-183202 | 9/1985 | Japan . | |
| 62-77441 | 4/1987 | Japan | 152/451 |
| 62-77442 | 4/1987 | Japan | 152/451 |
| 62-203615 | 9/1987 | Japan . | |

OTHER PUBLICATIONS

Hertzberg, Richard W., *Deformation and Fracture Mechanics of Engineering Materials*, 3rd ed.: New York, John Wiley & Sons, 1989, pp. 479-482.

Research Disclosure No. 21222: "Vehicle Tyre Reinforcement", Dec. 1981, pp. 456.

*Primary Examiner*—Michael W. Ball
*Assistant Examiner*—Adrienne C. Johnstone
*Attorney, Agent, or Firm*—Sughrue, Mion, Zinn, Macpeak & Seas

[57] ABSTRACT

A heavy duty pneumatic radial tire comprises at least one carcass ply reinforced with steel cords substantially arranged at an angle of 90° with respect to an equator of the tire and wound around a bead core from inside of the tire toward outside thereof. In this tire, the steel cord is made from steel wires each having a tensile strength of 330-400 kg/mm$^2$ and a cementite lamellar distance of 120-190 Å, a residual stress of whose is compression stress at a depth within a range of 1/10 to 1/5.5 of a wire diameter from the surface of the steel wire.

2 Claims, 2 Drawing Sheets

FIG_1
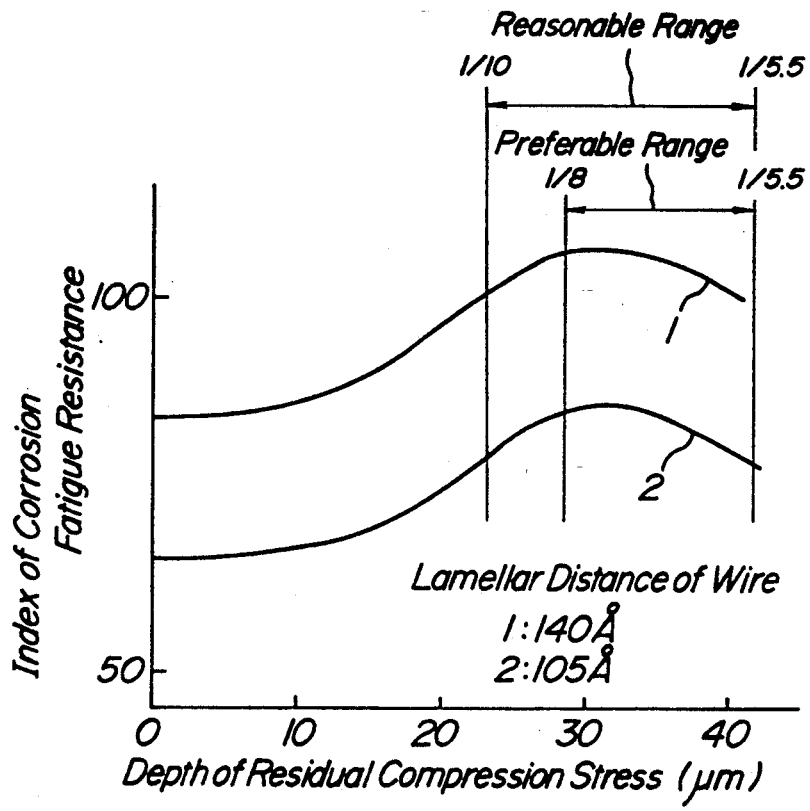
FIG_2
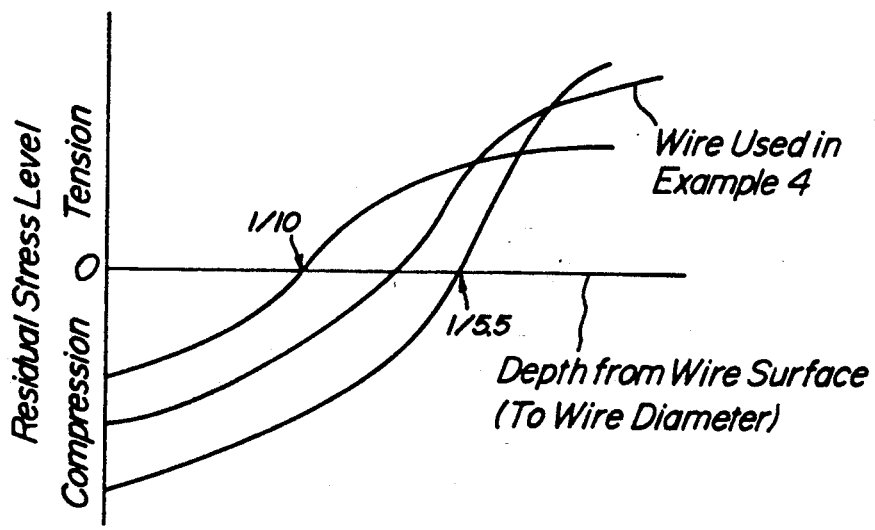

HEAVY DUTY PNEUMATIC RADIAL TIRES WITH FATIGUE RESISTANT STEEL CARCASS CORDS

BACKGROUND OF THE INVENTION

Field of the Invention

This invention relates to a heavy duty pneumatic radial tire simultaneously establishing improvement of durability and reduction of weight without degradation of corrosion fatigue resistance of carcass ply cord.

Related Art Statement

In conventional heavy duty pneumatic tires, steel cords are frequently used as a reinforcement for the carcass ply. In the carcass ply reinforcement, the weight reduction and the cost reduction are possible, and consequently the strength of the reinforcement is strongly required to be increased. However, when the strength of steel wire is made high, there is caused a phenomenon of lowering the durability, particularly corrosion fatigue resistance of the steel wire. That is, in case of increasing the strength of the steel wire, if the rubber article reinforced with such steel wires is subjected to variable stress under corrosion environment, there is caused a problem of decreasing the life of the article. In this connection, various countermeasure have been attempted. For example, Japanese Patent laid open No. 57-149578 discloses a metal cable having excellent mechanically fatigue properties by applying residual compression stress to a surface of a metal wire. Furthermore, Japanese Patent laid open No. 60-183202 discloses that the steel filament for steel cord has a pearlite structure having an average value of cementite lamellar distance of 300–500Å and the corrosion fatigue resistance is improved by finely dividing pearlite particles. Moreover, Japanese Patent laid open No. 62-203615 discloses a method wherein corrosion fatigue properties are improved by subjecting steel wires to iron or iron-nickel plating and further to a brass plating instead of the direct plating of brass plating to the steel wire.

The above Japanese Patent laid open No. 57-149578, describes that the mechanical fatigue properties of the metal cable is improved, but there is mentioned no corrosion fatigue property. Particularly, the tensile strength of the steel wire described in Example of this article is less than 330 kg/mm$^2$, so that in case of steel wire having a tensile strength of not less than 330 kg/mm$^2$ there is a drawback that the desired corrosion fatigue property can not be obtained only by applying residual compression stress to the surface of the wire. In Japanese Patent laid open No. 60-183202, the tensile strength of the steel filament is less than 300 kg/mm$^2$ as described in Example thereof, so that it is required to use a large amount of steel cord for ensuring the high safety ratio of heavy duty pneumatic tire, which is inconsistent with the purpose for reducing the weight of the tire. Also there is a drawback that the desired corrosion fatigue properties can not be obtained only by improving the pearlite structure and pearlite crystal particle in case of wires having a tensile strength of not less than 330 kg/mm$^2$. Moreover, Japanese Patent laid open No. 57-149578 discloses that the corrosion fatigue properties are improved by subjecting the steel wire to iron or iron-nickel plating and further to a brass plating thereon to form a protect layer against the corrosion. However, in order to obtain the protect layer having a good coating property, it is required to form iron or iron-nickel plated layer having a thickness of not less than 10 μm, which produces a drawback of decreasing the tensile strength and the productivity. Since steel cord obtained by twisting the steel wires is frequently used in the heavy duty pneumatic radial tire, there is a further drawback that brass plated layer and protect plated layer are abraded by fretting between the steel wires in the steel cord during the use of the tire to loose the protection action from the corrosion environment. That is, there are existent technical problems on the obtention of heavy duty pneumatic radial tires having improved corrosion fatigue resistance and durability with the reduction of tire weight.

As mentioned above, it is strongly demanded to use steel wires having high strength and excellent corrosion fatigue resistance for the manufacture of heavy duty pneumatic tires simultaneously satisfying weight reduction and durability, but it is difficult to cheaply and easily produce such steel wires.

SUMMARY OF THE INVENTION

The inventors have made various studies with respect to the material of the steel wire, and found that steel cords having high strength and excellent corrosion fatigue resistance are prepared from steel wires having no special composition and used as a reinforcing cord for carcass ply, whereby heavy duty pneumatic radial tires simultaneously satisfying weight reduction and durability are obtained.

According to the invention, there is the provision of a heavy duty pneumatic radial tire comprising at least one carcass ply reinforced with steel cords substantially arranged at a angle of 90° with respect to an equator of the tire and wound around a bead core from inside of the tire toward outside thereof; said steel cord being made from steel wires each having a tensile strength of 330–400 kg/mm$^2$ and a cementite lamellar distance of 120–190 Å, and a residual stress of said steel wire being compression stress at a depth within a range of 1/10 to 1/5.5 of a wire diameter from the surface of the steel wire.

BRIEF DESCRIPTION OF THE DRAWINGS

FIG. 1 is a graph showing a relationship between index of corrosion fatigue resistance and depth of residual compression stress in wire for reinforcing cord of carcass ply used in Example 4 and Comparative Example 7;

FIG. 2 is a graph showing a relationship of level of residual stress to depth from a surface of the wire (diameter ratio of wire) for reinforcing cord of carcass ply used in Example 4.

DESCRIPTION OF THE PREFERRED EMBODIMENTS

Figure 3:
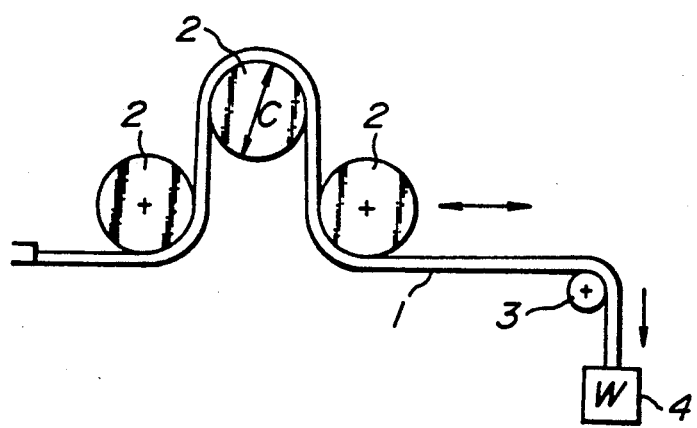
FIG. 3 is a schematic view of three-point pulley testing device for the test of corrosion fatigue resistance.

The production of the steel cord having an improved corrosion fatigue resistance used in the invention is as follows. That is, steel SWRH or 82A defined according to JIS G3506 is used as a steel material, which is first subjected to a heat treatment for improving the drawing workability, wherein the number of intermediate heating treatments is reduced as far as possible in order to make same the difference between carbon content of surface layer in the steel wire and carbon content inside the steel wire, or the reduction of carbon content in the surface layer due to decarburization is controlled by by subjecting the wire to solid solution under conditions of temperature, atmosphere, time and the like in the wire surface treatment during the heat treatment causing no decarburization. Then, the heat treated wire is quenched to a temperature of not lower than 630° C. but lower than 660° C. at a rate of 140° C./sec so as to provide a lamellar distance of the wire of 1000–1400 Å and held at this temperature for not less than about 12 seconds. This wire is pickled and subjected to a plating in the usual manner and then drawn at a reduction ratio of not less than 97% in the usual manner so as to provide desirable tenacity and lamellar distance of 120–190 Å at subsequent step. Thereafter, the drawn wire is passed through rolls arranged zigzag at a state of applying a tensile force of 70–170 kg/mm$^2$ for giving residual compression stress to a region of the wire ranging from the surface of the wire to a depth corresponding to 1/10–1/5.5 of the wire diameter, whereby it is repeatedly subjected to bending working so as to render the bending strain at the wire surface into not less than 1%.

According to the invention, the reason why the lamellar distance of the wire constituting the reinforcing cord for the carcass ply used in the invention is limited to 120–190 Å is due to the fact that when the lamellar distance is less than 120 Å, the corrosion fatigue resistance extremely lowers. When it exceeds 190 Å, the tensile strength of not less than 330 kg/mm$^2$ can not be obtained. Furthermore, the reason why the carbon content of the wire is controlled is due to the fact that as the decarburized layer in the wire surface becomes thicker, the mechanical strength, mechanical fatigue property and corrosion fatigue resistance are degraded in the product wire. Particularly, when the residual compression stress is applied to the region of the wire ranging from the wire surface to a range corresponding to 1/10–1/5.5 of the wire diameter, the crack propagation rate can be reduced, whereby the corrosion fatigue resistance of the tire can be improved to not less than about 20%. When the residual stress at the region corresponding to $\frac{1}{8}$–1/5.5 of the wire diameter is compression stress, the corrosion resistance of the tire is further improved. In order to reduce the tire weight and further improve the resistance to ply end separation as mentioned later, the tensile strength is preferable to be not less than 350 kg/mm$^2$. If the residual stress is tensile stress at a region from the wire surface to not more than 1/10 of the wire diameter, the effect of compression stress to the corrosion fatigue resistance of the tire is less, However, when the region having the residual compression stress exceeds 1/5.5 of the wire diameter, the wire breakage increases at the application of bending strain, and the damage on the wire surface increases, which are factors of increasing the degradation of the corrosion fatigue resistance. Therefore, when a crack deeply grows into the inside of the wire exceeding over 1/5.5 of the wire diameter, even if the compression stress is applied up to a region exceeding over 1/5.5 of the wire diameter, the total effect based on the input of the compression stress is substantially lost, and finally the corrosion fatigue resistance is degraded.

When using the steel cords satisfying the above requirements, the end count can be reduced as the casing strength is same, and consequently the resistance to ply end separation, which is a primary trouble in the heavy duty pneumatic radial tire such as radial tires for truck and bus, can be improved.

When the tensile strength of the steel wire constituting the steel cord, the effect of reducing the tire weight is small and also the effect of improving the resistance to ply end separation is small. On the other hand, when the tensile strength exceeds 400 kg/mm$^2$, the lamellar distance becomes too narrower even when using the above method for the improvement of corrosion fatigue resistance, or the drawing becomes difficult, or the damage due to the drawing increases, and finally the corrosion fatigue resistance is degraded.

The following examples are given in illustration of the invention and are not intended as limitations thereof.

EXAMPLES 1–5, COMPARATIVE EXAMPLES 1–7

Test tires of Examples 1–5 and Comparative Examples 1–7 having a tire size of TBR 285/75 R24.5 14PR or TBR 1000 R20 14PR were manufactured by using steel cords of 3×0.20+6×0.35 structure made from steel wires each containing 0.75 wt % of carbon as a cord for the belt and steel cords shown in the following Tables 1 and 2 as a cord for the carcass ply, respectively. With respect to these test tires, the weight reduction, corrosion fatigue resistance and resistance to ply end separation were measured by the following evaluation methods to obtain results as shown in Table 1 relating to the tire size of TBR 285/75 R24.5 14PR and in Table 2 relating to the tire size of TBR 1000 R20 14PR, respectively. Moreover, the tensile strength of steel wire constituting the steel cord, internal residual stress (measured by Selective Etching Method, which is disclosed on column 8, lines 13 to 32 of U.S. Pat. No. 4,481,996), lamellar distance and cord tenacity were measured using the steel cord taken out from the tire.

EVALUATION METHODS

(1) Weight Reducing Effect

The effect of reducing the weight by reducing the end count in each test tire when the strength of the steel cord in each treat of the test tires is made equal to that of the control tire of each of Comparative Examples 1 and 6 was indicated by the weight of steel cords used in one tire as an index against the control tire. The smaller the index value, the better the weight reduction effect.

(2) Corrosion Fatigue Resistance (Degradation Degree)

As shown in FIG. 3, the test method was carried out by extending a rubberized cord 1 taken out from the tire among three pulleys 2 having a diameter C of 40 mm, fixing it to a weight 4 through a fixed pulley 3 while applying a tensile load corresponding to 10% of a load at break of new cord to the weight 4, repeatedly moving the three pulleys over a distance of 20 cm in right and left directions to repeatedly apply a bending strain to the cord until the fatigue breakage of the cord. In this case, the repeating number causing the cord breakage was measured as an average breakage number of ten cords and compared with that of cord in new tire, from which the reduction degree when the cord of the new tire was 100 was measured as a degradation degree of corrosion fatigue resistance. The corrosion fatigue resistance shown in Tables 1 and 2 were indicated as an index on the basis that the control tire in each of Comparative Examples 1 and 6 was 100. The larger the index value, the better the corrosion fatigue resistance.

(3) Resistance to Ply End Separation

The tread rubber of the test tire was buffed to evaluate the bead durability at a state of causing no trouble of belt layer due to heat build-up of the belt layer. Concretely, the test tire was run on a drum at a speed of 60 km/hr under an internal pressure of 8.25 kg/mm² and a load of JIS 200%, during which the running distance when separation was caused at the top of the carcass ply cord to make large vibration was measured and indicated as an index as compared with the control tire of Comparative Example 1 or 6. The larger the index value, the better the bead durability.

(4) Measurement of Lamellar Distance of Steel Wire

The lamellar distance of the drawn steel wire was measured by subjecting the cross sectional plane of the wire to electrolytic polishing to prepare a thin film and observing the film through a permeation type electron microscope. A narrowest portion of lamellar distance was measured. The measured position was substantially a central portion of the wire.

TABLE 1

| | | Tire size 285/75 R 24.5 14 PR Tire No. | | | | |
|---|---|---|---|---|---|---|
| | | 1 Comparative Example 1 | 2 Comparative Example 2 | 3 Comparative Example 3 | 4 Comparative Example 4 | 5 Comparative Example 5 |
| Cord structure | | 3 + 9 × 0.20 + 1 | 3 + 9 × 0.20 + 1 | 3 + 9 × 0.20 + 1 | 3 + 9 × 0.20 + 1 | 3 + 9 × 0.20 + 1 |
| Pitch | | 6/8/3.5 | 6/8/3.5 | 6/8/3.5 | 6/8/3.5 | 6/8/3.5 |
| Twisting direction | | S/S/Z | S/S/Z | S/S/Z | S/S/Z | S/S/Z |
| Lamellar distance of wire (Å) | | 150 | 100 | 200 | 130 | 130 |
| Tensile strength of wire (kg/mm²) | | 307 | 385 | 305 | 385 | 381 |
| Cord tenacity (kg) | | 101 | 127 | 101 | 127 | 126 |
| Depth of residual compression stress from surface (μm) | | 15 | 15 | 6 | 10 | 39 |
| Tire performances | end count (cords/50 mm) | 30.0 | 23.9 | 30.0 | 23.9 | 24.0 |
| | weight reduction effect (index) | 100 | 80 | 100 | 80 | 80 |
| | corrosion fatigue resistance (index) | 100 | 72 | 120 | 90 | 98 |
| | resistance to ply end separation (index) | 100 | 110 | 100 | 110 | 110 |

| | | Tire size 285/75 R 24.5 14 PR Tire No. | | |
|---|---|---|---|---|
| | | 6 Example 1 | 7 Example 2 | 8 Example 3 |
| Cord structure | | 3 + 9 × 0.20 + 1 | 3 + 9 × 0.20 + 1 | 3 × 0.22 + 9 × 0.20 + 1 |
| Pitch | | 6/8/3.5 | 6/8/3.5 | 12/12/3.5 |
| Twisting direction | | S/S/Z | S/S/Z | S/S/Z |
| Lamellar distance of wire (Å) | | 130 | 160 | 135/130 |
| Tensile strength of wire (kg/mm²) | | 385 | 242 | 370/384 |
| Cord tenacity (kg) | | 127 | 113 | 134 |
| Depth of residual compression stress from surface (μm) | | 32 | 27 | 32 |
| Tire performances | end count (cords/50 mm) | 23.9 | 26.8 | 22.6 |
| | weight reduction effect (index) | 80 | 89 | 80 |
| | corrosion fatigue resistance (index) | 105 | 110 | 108 |
| | resistance to ply end separation (index) | 110 | 105 | 112 |

TABLE 2

| | Tire size 1000 R20 14PR Tire No. | | | |
|---|---|---|---|---|
| | 1 Comparative Example 6 | 2 Comparative Example 7 | 3 Example 4 | 8 Example 5 |
| Cord structure | 3 + 9 × 0.23 + 1 | 3 + 9 × 0.23 + 1 | 3 + 9 × 0.23 + 1 | 3 × 0.24 + 9 × 0.225 + 1 |
| Pitch | 6/12/3.5 | 6/12/3.5 | 6/12/3.5 | 12/12/3.5 |
| Twisting direction | S/S/Z | S/S/Z | S/S/Z | S/S/Z |
| Lamellar distance of wire (Å) | 155 | 105 | 140 | 142/138 |
| Tensile strength of wire (kg/mm$^2$) | 290 | 360 | 360 | 355/365 |
| Cord tenacity (kg) | 141 | 170 | 170 | 171 |
| Depth of residual compression stress from surface (μm) | 18 | 18 | 34 | 34 |
| Tire performances — end count (cords/50 mm) | 30.3 | 25.1 | 25.1 | 25.0 |
| weight reduction effect (index) | 100 | 81 | 81 | 80 |
| corrosion fatigue resistance (index) | 100 | 74 | 106 | 109 |
| resistance to ply end separation (index) | 100 | 110 | 110 | 110 |

Comparative Example 1 is a case of using the conventional steel cord. In this case, the tensile strength is low. Furthermore, the amount of steel cords used is large and the end count is dense, so that the resistance to ply end separation is poor.

Comparative Example 2 is a case of merely improving the tensile strength in the wire of Comparative Example 1 by the conventional technique. In this case, the tensile strength is certainly increased, and the weight reduction and the resistance to ply end separation are arrived to the target values, but the lamellar distance becomes narrower and the corrosion fatigue resistance largely lowers at such a compression stress.

In Comparative example 3, the corrosion fatigue resistance is largely improved, but the tensile strength is not improved because the lamellar distance is too wide and consequently the effect of reducing the weight and improving the resistance to ply end separation is not obtained.

In Comparative Example 4, the residual stress is not deeply applied, so that even when the lamellar distance is within the range defined in the invention, the corrosion fatigue resistance does not reach the target value.

Comparative Example 5 is a case of excessively applying compression stress. In this case, the problem of surface damage is caused to lower the corrosion fatigue resistance of the tire.

Examples 1 to 3 show the use of the steel cord according to the invention, respectively. In this case, the weight reduction effect, corrosion fatigue resistance and resistance to ply end separation are simultaneously improved.

When the results of Comparative examples 6 and 7 are compared with those of Examples 4 and 5, the tire performances of Examples 4 and 5 are excellent as compared with those of Comparative Examples 6 and 7 likewise the cases of Examples 1 to 3.

FIG. 1 illustrates a relationship between the index of corrosion fatigue resistance and the depth of residual compression stress (μm) of the wires used in Example 4 and Comparative Example 7, wherein a curve 1 is a case of using the wire of Example 4 and a curve 2 is a case of using the wire of Comparative Example 7. As seen from the curve 1, the corrosion fatigue resistance of the wire is considerably improved by a synergistic action of the lamellar distance of the wire and the residual compression stress in the depth direction of the wire. In FIG. 1, the reasonable range shows a region of the wire ranging from the surface of the wire to a depth corresponding to 1/10–1/5.5 of the wire diameter, and the preferable range shows a region of the wire ranging from the surface of the wire to a depth corresponding to ⅛–1/5.5 of the wire diameter.

FIG. 2 illustrates a relation of the residual stress level to the depth from the surface of the wire (diameter ratio of wire) used in Example 4, from which it is obvious that the effect of the invention is developed when the residual stress curve passing through a width of a region in the depth direction of the wire defined in the invention (region ranging from the wire surface to a depth corresponding to 1/10–1/5.5 of the wire diameter) is compression side.

As mentioned above, in the heavy duty pneumatic radial tire according to the invention, the durability and weight reduction can simultaneously be established by using as a cord for carcass ply steel cords each made from steel wires each having a tensile strength of 330–440 kg/mm$^2$ and a lamellar-distance of 120–190 Å as a metal structure of the wire, in which a residual stress of a region in the wire ranging from the wire surface to a depth corresponding to 1/10–1/5.5 of the wire diameter.

What is claimed is:

1. A heavy duty pneumatic radial tire comprising at least one carcass ply reinforced with steel cords substantially arranged at an angle of 90° with respect to an equator of the tire and wound around a bead core from inside of the tire toward outside thereof; said steel cord being made from steel wires each having a tensile strength of 330–400 kg/mm² and a cementite lamellar distance of 120–190 Å, and a residual stress of said steel wire being compression stress at a depth within a range of 1/10 to 1/5.5 of a wire diameter from the surface of the steel wire.

2. The heavy duty pneumatic radial tire according to claim 1, wherein said wire has a tensile strength of 350–390 kg/mm² and said residual stress of said wire is compression stress at a depth within a range of ⅛ to 1/5.5 of a wire diameter from the surface of the steel wire.

* * * * *